United States Patent [19]

Imondi

[11] 3,806,592

[45] Apr. 23, 1974

[54] METHOD FOR EVALUATING BILE SUFFICIENCY

[75] Inventor: Anthony R. Imondi, Westerville, Ohio

[73] Assignee: Rohm and Haas Company, Philadelphia, Pa.

[22] Filed: Dec. 18, 1970

[21] Appl. No.: 99,714

[52] U.S. Cl. .................................... 424/7, 424/9
[51] Int. Cl. ...................... G01n 21/52, G01n 31/22
[58] Field of Search ........... G01n/33/16; 424/7, 8, 9

[56] References Cited
OTHER PUBLICATIONS

Boquist, Acta. Path. Microbiol. Section A, Vol. 78, 1970, pp. 323–334.
Chem. Abs., Vol. 64, 1966, p. 6,973 (Guibault et al.)
Chem. Abs., Vol. 71, 1969, No. 37,034fj 46,069j; 47,578a Primary Examiner—Albert T. Meyers
Assistant Examiner—A. P. Gagelson
Attorney, Agent, or Firm—G. W. F. Simmons; C. A. Castellan; William E. Lambert, III

[57] ABSTRACT

Sufficiency of bile secretion in an animal organism can be evaluated by internally administering to the animal an effective amount of a peptide of the formula $$Q-NHQ'-Q'',$$

wherein Q is an amine-blocking group,
NHQ'CO is an amino acid linkage, and
Q'' is an analyzable group,
internally administering an effective amount of a dialkyl ester of fluorescein, collecting the urine of the animal, and analyzing the urine to determine the quantity of the hydrolyzed analyzable group and the quantity of fluorescein in the urine.

16 Claims, No Drawings

METHOD FOR EVALUATING BILE SUFFICIENCY

This invention relates to a novel diagnostic test for evaluating bile sufficiency in animals.

Digestion of food occurs primarily in the upper regions of the small intestine where pancreatic juice and bile mix with the chyme passing out of the stomach. In this digestive process, the pancreatic juice supplies digestive enzymes which are responsible for the degradation of proteins, carbohydrates, and fat, while the bile supplies bile salts which function synergistically with pancreatic lipase in breaking down triglycerides. Thus, the absence of either pancreatic juice or bile will result in an abnormal concentration of undegraded fat in the feces.

Bile is secreted by the liver and is stored in the gallbladder. When the chyme enters the upper small intestine, the flow of bile into the intestine is stimulated. Normally, the bile salts will be reabsorbed in the ileum and recirculated through the liver so that only a very small quantity of the bile salts pass out of the animal's system.

An insufficiency of bile in the intestine may result from impaired liver function, from obstruction of the bile ducts, or from some interference with the normal enterohepatic circulation of the bile salts, which may for example occur following surgical removal of the ileum. When intraluminal bile salt concentrations are decreased because of either biliary obstruction or hepatic disease, diagnosis can often be made with routine clinical test. However, in some cases, such as when the total bile salt pool is diminished, intubation and analysis of the intestinal contents for bile salts has been the only practical diagnostic approach.

It has been discovered that pancreatic enzyme sufficiency in an animal organism can be evaluated by internally administering an effective amount of a polypeptide which is hydrolyzable by one or more of the pancreatic endopeptidases to give a residue which is absorbable by and recoverable from the organism. This residue will be absorbed and subsequently excreted in the urine, where analysis can determine the presence or absence of the residue. In animals with normal pancreatic function, the peptide is hydrolyzed to liberate an amino acid or other residue which is then absorbed, excreted, and analytically detected. In animals in which abnormal pancreatic function has been produced, the peptide remains substantially unhydrolyzed, thus resulting in essentially no detectable residue in the urinary analysis. This test method and peptides useful in carrying out the test are described in U.S. Patent application Ser. No. 91,173, of P. L. deBenneville and N. J. Greenberger, filed on Nov. 19, 1970, now U.S. Pat. No. 3,745,212 and entitled "Method for Evaluating Pancreatic Enzyme Sufficiency and Compounds Useful Therein". This test is occasionally referred to herein as the Greenberger-deBenneville test.

Esters of fluorescein have also been suggested in the literature for use in diagnosing pancreatic insufficiency. In this test, the fluorescein esters are hydrolytically cleaved in the presence of certain pancreatic enzymes to give fluorescein which is absorbed and excreated, and can then be analyzed for in the urine. However, it has now been found that the presence of bile as well as of the pancreatic enzymes is necessary to effect this cleavage. Thus, the absence of fluorescein in the urine following the administration of the fluorescein ester may indicate either a pancreatic enzyme insufficiency, or a bile insufficiency, or both.

It has now been found that bile sufficiency in an animal organism can be evaluated by administering to the animal both a peptide sensitive to hydrolytic cleavage in the presence of pancreatic enzyme secretions and a fluorescein ester sensitive to hydrolytic cleavage in the presence of bile and pancreatic enzyme secretions. According to the invention, this bile sufficiency test is carried out by internally, preferably orally, administering to an animal an effective amount of a peptide of the formula

(I)

wherein
Q is an amino-blocking group,
NHQ'CO is an amino acid linkage hydrolytically cleavable from the peptide in the presence of a pancreatic endopeptidase, and
Q" is a pharmacologically-acceptable analyzable group hydrolytically cleavable from the peptide in the presence of a pancreatic endopeptidase to give an analyzable compound which can be absorbed by and excreted from the animal;

internally administering to the animal an effective amount of a $(C_4-C_{16})$ dialkyl ester, preferably a $(C_6-C_{12})$ dialkyl ester, of fluorescein; thereafter collecting the urine of the animal for a sufficient time to permit accumulation of the analyzable compound and of fluorescein; and analyzing the collected urine to determine the quantity of the analyzable compound and the quantity of fluorescein in the urine.

In animals with normal pancreatic function and normal bile secretion, the urinary analysis will reveal both fluorescein and the analyzable residue from the peptide. In animals with normal pancreatic function but abnormal bile secretion, the urinary analysis will reveal the analyzable residue but will lack significant fluorescein concentration. In animals with abnormal pancreatic function, the urinary analysis will reveal neither fluorescein nor the analyzable residue, and further tests will be necessary to determine bile sufficiency. Thus, the method of the invention not only provides a means for detecting bile insufficiency in animals with normal pancreatic function, but also combines into one relatively simple procedure tests for both pancreatic and bile sufficiency.

A wide variety of peptides can be used in the method of the invention, and any peptide which contains three essential components can be employed. The first essential component is an amino acid linkage which will be hydrolytically cleaved in the presence of one of the pancreatic endopeptidases. The second essential element is a blocking group on the amino function of this amino acid linkage. This third essential element is a pharmacologically-acceptable analyzable group which will be hydrolyzed from the polypeptide in the presence of a pancreatic enzyme to produce a compound which is absorbed and eliminated in the body, and which is easily determinable by quantitative analytical techniques. Polypeptides which meet these requirements can be represented by the general formula

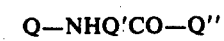

(I)

wherein
Q represents the amine-blocking group,
NHQ'CO represents the hydrolyzable amino acid linkage, and
Q'' represents the analyzable group.

Any amino acid linkage which will be hydrolyzed by one of the pancreatic endopeptidases can be used in the peptides of formula I. In one embodiment of the invention, the amino acid linkage which is selected is one which is hydrolyzable in the presence of any of the group of pancreatic enzymes usually referred to as chymotrypsin For example, chymotrypsin will cause cleavage of an internal —CONH— or —COO— linkage if the —CO— function comes from L-phenylalanine, a derivative of L-phenylalanine, such as L-tyrosine, L-leucine, L-methionine, or L-tryptophan. Thus any of these amino acids can be selected as the amino acid linkage (NHQ'CO in formula I) for the peptide used in the test. Furthermore, since the presence of the pancreatic enzyme trypsin will lead to hydrolytic cleavage of an internal —CONH— or —COO— linkage if the —CO— function comes from L-lysine or L-arginine, either of these two amino acids can be selected as the amino acid linkage in the test peptide.

A wide variety of blocking groups (Q in Formula I) can be used to block the amino function in the amino acid linkage. Generally, an acyl group, such as an alkylcarbonyl group, an arylcarbonyl group, an aralkylcarbonyl group, an alkarylcarbonyl group, an arylsulfonyl group, alkylsulfonyl group, an alkylcarbamoyl group, an arylcarbamoyl group, an alkoxycarbonyl group, an aryloxycarbonyl group, or the like, will be chosen.

The analyzable group (Q'' in Formula I) must meet several requirements. First, it must be pharmacologically acceptable; that is, it must not cause undesirable effects in the animal organism to which the peptide is administered. Second, it must be hydrolyzed from the peptide to give a substance which is absorbed into the body and then excreted in the urine, preferably relatively rapidly. Third, the hydrolyzed substance must be determinable by quantitative analytical techniques. Any group which meets these requirements can be used as the analyzable group. The analyzable group can form either an ester or an amide with the carboxyl group of the amino acid linkage.

A preferred group of peptides which are useful in the test method of the invention have the following formula

(II)

wherein
R is a hydrogen atom; a phenyl group; a phenyl group substituted with one or more halogen atoms, $(C_1-C_4)$ alkyl groups, hydroxy groups, $(C_1-C_4)$ alkoxy groups, $(C_1-C_4)$ alkoxy carbonyl groups, or similar substituents which will not interfere with the test efficacy of the polypeptide; a $(C_1-C_{12})$ alkyl group, preferably a $(C_1-C_6)$ alkyl group; a $(C_1-C_{12})$ alkyl group substituted by one or more halogen atoms, $(C_1-C_4)$ alkoxy groups, hydroxy groups, acyloxy groups, preferably $(C_1-C_4)$ alkanoyloxy or benzoyloxy, polyalkoxyalkyl groups, phenyl groups, or similar substituents which will not interfere with the test efficacy of the polypeptide; a $(C_1-C_{12})$ alkoxy group, preferably a $(C_1-C_6)$ alkoxy group; an aryloxy group having up to 10 carbon atoms; or a divalent alkylene group having up to six carbon atoms, in which case formula II would be written as

(IIa)

or, when the blocking group is derived from oxalic acid, as

(IIb);

NHR'CO is the amino acid linkage derived from L-phenylalanine, L-tryosine, L-leucine, L-methionine, L-tryptophan, L-arginine, or L-lysine;

Z is a group of the formula

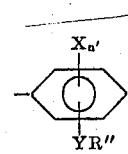

where
R'' is a hydroxy group, a $(C_1-C_4)$ alkoxy group, a $(C_1-C_4)$ alkoxyalkoxy group, a $(C_1-C_8)$ aminoalkoxy group, an amino group, a $(C_1-C_4)$ monoalkylamino group, a $(C_1-C_4)$ dialkylamino group, a group of the formula —NHCH$_2$COR''', or a salt, such as the sodium, potassium, or ammonium salt, of the group in which R'' is a hydroxy group;
Y is a group of the formula —CO— or —SO$_2$—;
X is a hydroxy group, a $(C_1-C_4)$ alkyl group, a halogen atom, a $(C_1-C_4)$ alkoxy group, or a similar substituent which will not interfere with the test efficacy of the polypeptide; and
$n'$ is 0, 1, or 2;
A and B are the residues of low molecular weight amino acids, such as glycyl, alanyl, glycylglycyl, and the like, and
$n$ and $m$ are 0, 1, or 2.

In general, the test will be facilitated by a relatively high solubility of the peptide in the body system. Consequently, those peptides having relatively low molecular weight, and those peptides having a free carboxy group or a salt of a carboxy group are especially preferred.

Representative examples of suitable RCO-groups include benzoyl, adipoyl, malonyl, succinoyl, formyl, acetyl, propionyl, butyryl, hexanoyl, heptanoyl, octanoyl, dodecanoyl, acetosalicylyl, oxalyl, ethoxycarbonyl, benzyloxycarbonyl, chlorobenzoyl, iodobenzoyl, toluoyl, ethylbenzoyl, anisoyl, chloroacetyl, ethoxypropionyl, hydroxybutyryl, phenylacetyl, and the like.

Representative examples of suitable —NHZ groups include those derived from p-aminobenzoic acid, m-amino-benzoic acid, 4-amino-3-iodobenzoic acid, 4-amino-2-hydroxybenzoic acid, 4-amino-3-methylbenzoic acid, 4-amino-2, 6-dimethylbenzoic acid, 4-aminohippuric acid, p-aminobenzene-sulfonic acid, 4-amino-2-ethylbenzoic acid, 4-amino-2-butylbenzoic acid, 4-amino-2-bromobenzoic acid, 4-amino-2-ethoxybenzoic acid, 3-amino-4-hydroxybenzoic acid, 3-amino-4-methylbenzoic acid, 3-amino-4-chlorobenzoic acid, m-amino-benzenesulfonic acid, anthranilic acid, 4-amino-3-methyl-benzenesulfonic acid, 4-amino-3-hydroxybenzenesulfonic acid, and the like, the salts, such as the sodium, potassium, and ammonium salts, of such acids, the ($C_1$-$C_4$) alkyl esters, such as the methyl, ethyl, n-propyl, isopropyl, n-butyl, isobutyl, and t-butyl esters, of such acids, the ($C_1$-$C_4$) alkoxy-alkyl esters, such as the ethoxyethyl and methoxyethyl esters of such acids, the ($C_1$-$C_6$) aminoalkyl esters, such as the N,N-dimethylaminoethyl, morpholinoethyl, piperidinoethyl, piperazinoethyl, and N,N-diethylaminomethyl esters of such acids, the amides of such acids, and the alkyl amides such as the N,N-diethylamides, of such acids. The free acids and their salts are preferred.

Representative examples of peptides of formula II which are useful in the test of the invention include:
ethyl N-benzoyl-DL-phenylalanyl-p-aminobenzoate
ethyl N-benzoyl-L-phenylalanylglycyl-p-aminobenzoate
methyl N-benzoyl-L-phenylalanyl-p-aminohippurate
methyl N-benzoyl-DL-phenylalanyl-p-aminohippurate
methyl N-benzoyl-L-phenylalanylglycylglycyl-p-aminohippurate
ethyl N-benzoyl-L-phenyalanyl-p-aminobenzoate
ammonium N-benzoyl-L-phenylalanylglycylglycyl-p-aminohippurate
N-benzoyl-DL-phenylalanyl-p-aminobenzoic acid
N-benzoyl-L-phenylalanyl-p-aminobenzoic acid
N-benzoyl-DL-phenylalanyl-p-aminohippuric acid
N-benzoyl-L-phenylalanyl-p-aminohippuric acid
diammonium adipoyl-bis(L-phenylalanyl-p-aminobenzoate)
sodium N-benzoyl-L-phenylalanyl-p-aminobenzoate
sodium N-benzoyl-L-phenylalanyl-p-aminohippurate
disodium adipoyl-bis(L-phenylalanyl-p-aminobenzoate)
sodium N-acetyl-L-phenylalanyl-p-aminohippurate
N-benzoyl-L-phenylalanyl-p-aminobenzenesulfonamide
sodium N-benzoyl-L-tyrosyl-p-aminobenzoate
disodium adipoyl-bis(L-tryosyl-p-aminobenzoate)
sodium N-acetyl-L-trysoyl-p-aminobenzoate
sodium N-propionyl-L-tyrosyl-p-aminobenzoate
sodium N-butyryl-L-tyrosyl-p-aminobenzoate
sodium N-benzoyl-L-tryptophyl-p-aminobenzoate
sodium N-ethoxycarbonyl-L-tryosyl-p-aminobenzoate
sodium N-benzoyl-L-tyrosyl-o-aminobenzoate
sodium N-benzoyl-L-tyrosyl-m-aminobenzoate
sodium N-benzoyl-L-tyrosyl-4-amino-3-methylbenzoate
sodium N-benzoyl-L-leucyl-p-aminobenzoate
sodium N-benzoyl-L-methionyl-p-aminobenzoate Although only the L-isomer of a peptide of the invention is actually cleaved in the presence of the pancreatic enzymes, racemic mixtures of the peptides can be used without any interference with the test procedure or results. Generally, however, when a racemic mixture is used, a double dose of the peptide must be given.

The peptides useful in the method of the invention are generally prepared by first blocking the amino group of the amino acid with any of the suitable blocking groups. Various preparative techniques for carrying out this blocking step are well-known in the art and can be followed in preparing the peptides of the invention. One useful method involves reacting the amino acid with the acid chloride of the blocking group in the presence of a basic catalyst or a base scavenger in either an aqueous or nonaqueous system. The analyzable group is then attacked by amidation or esterification of blocked amino acid. Various preparative techniques which are well-known in the art can be used for making the amides and esters. One useful novel method involves reacting a mixed anhydride of the blocked amino acid with the amino-containing analyzable group. The mixed anhydride can conveniently be prepared by reacting the blocked amino acid with ethyl chloroformate in the presence of a tertiary amine. Generally, the mixed anhydride is then reacted with an ester containing the free amino group. The reaction of the mixed anhydride with a free acid containing an amino group is a separate invention which is disclosed and claimed in another patent application, Ser. No. 256,551, filed on May 24, 1972, by P. L. deBenneville, W. J. Goffrey and H. J. Sims, and assigned to a common assignee. Specific embodiments of suitable techniques for preparing the peptides useful in the test method of the invention are found in the examples below.

The fluorescein esters which are used in the test method of the invention are compounds which are known and readily available. Generally, these esters are prepared by reacting the disodium salt of fluorescein with a suitable acid chloride. Suitable synthetic methods for the preparation of these esters are described in J. G. Meyer-Bertenrath, *Hoppe-Seyler's Z. Physiol. Chem.*, 349, 728–729 (1968), and references cited therein.

Among the fluorescein esters which are useful in the test method of the invention are fluorescein dibutyrate, fluorescein dihexanoate, fluorescein diheptanoate, fluorescein dioctanoate, fluorescein dinonanoate, fluorescein didecanoate, fluorescein dilurate, fluorescein dimyristate, fluorescein dipalmitate, and the like.

The bile sufficiency test is carried out by internally administering, generally orally, an effective dosage of one of the pancreatic enzyme-sensitive peptides and an effective dosage of one of the fluorescein esters. The peptide and the ester can be administered either simultaneously or sequentially. If sequentially administered, either the peptide or the ester can be given first. Thereafter the urine is collected for a suitable period of time, and analyzed to determine the quantity of the appropriate peptide fragment and the quantity of fluorescein present. Generally, it has been found that a urine collection procedure of from about 4 to about 10 hours, and preferably from about 5 to about 7 hours, after administration of the test compounds will provide a suitable test. If the pancreas is secreting enzymes normally, the presence of the pancreatic enzymes will cause cleavage of the peptide, and a high quantity of the analyzable residue will be recovered in the urine. If the pancreas is secreting enzymes normally, and bile secretion is also normal, the presence of pancreatic enzymes will cause cleavage of the fluorescein ester, and the presence of a significant quantity of free fluorescein will be detectable in the urine. However, if the pancreas is secreting enzymes normally, as confirmed by the presence of the analyzable peptide residue in the urine, but bile secretion is abnormal, the fluorescein ester will not be readily cleaved, and no significant quantity of free fluorescein will be detectable in the urine. In the absence of normal pancreatic function, either the peptide nor the fluorescein ester will be readily cleaved and only a small quantity of the analyzable residue or fluorescein will be detectable in the urine.

It should be noted that the bile sufficiency test of the invention can be carried out in either a single stage or a two-stage operation; that is, the peptide and the ester can be given at approximately the same time, and analysis for both the analyzable residue and fluorescein carried out on the collected urine, or the peptide can be given, urine collected, and analysis run at one time, followed after a suitable period (or preceded) by the same test sequence with the fluorescein ester.

The amount of peptide which is administered to the animal must be sufficient to produce an analyzable residue in the urine of a normal animal. Generally, an amount of about 2 mg to about 50 mg of the peptide per kilogram of body weight of the animal will be effective in carrying out the test of the invention. A preferred dosage rate is about 5mg/kg to about 10 mg/kg of the peptide. In humans, a dosage of about 350 mg to about 700 mg, such as, for example, about 500 mg, will generally be effective.

The amount of fluorescein ester which is administered to the animal must be sufficient to produce an analyzable residue in the urine of a normal animal. Generally, an amount of about 2 mg to about 50 mg of the ester per kilogram of body weight of the animal will be effective in carrying out the test of the invention. A preferred dosage rate is about 5 mg/kg to about 10 mg/kg of the ester. In humans, a dosage of about 300 mg to about 700 mg, such as, for example about 500 mg, will generally be effective.

A wide variety of test protocols can be employed in carrying out the bile sufficiency test of the invention. The following procedure is exemplary of those which can be employed.

The test should be administered in the morning after a light non-fatty breakfast. The urinary bladder should be emptied before the start of the test.

The test subject is given a suitable oral dose of a pancreatic enzyme sensitive peptide, such as for example a 0.5 gram oral dose for a human subject, and of a fluorescein ester, such as for example a 0.5 gram oral dose for the human subject, and all urine is collected for the following 6 hours. Care should be taken to obtain a urine sample between the fifth and sixth hours. Water or caffeine may be administered during the test period to induce urination but other diuretics and drugs should generally be withheld. Snacks or a light non-fatty meal may be permitted.

The total urine volume is determined and either the entire sample or an aliquot is refrigerated or frozen until chemical analysis.

The urine is then analyzed for the analyzable group and for fluorescein. For example, when the analyzable group is an aromatic amine, the Bratton-Marshall method using p-aminobenzoic acid as a standard can be employed. When the analyzable group is p-aminobenzoic acid, individuals with normal exocrine pancreatic secretion will generally excrete at least 25 percent of the ingested p-aminobenzoic acid or about 40 mg of p-aminobenzoic acid during the 6 hour test period after correcting for background urinary aromatic amines. The background may be ascertained on a six-hour urinary collection on the day prior to the test or a value of 3 mg per 6 hours may be assumed.

Fluorescein in urine can be analyzed by the method of Kaffarnik and Meyer-Bertenrath (*Klin. Wschr.* 47(4):221–223, 1969) which involves alkalinization of the urine followed by absorbance measurement at 492 nm. Background urinary fluorescein is generally nil and need not be considered. Recovery in urine of 15 percent of the fluorescein administered as part of the ester or approximately 40 mg during the test period would be indicative of normal bile secretion.

Detection of an unusually small percentage, such as, for example, less than about 2 percent of the administered dose of fluorescein ester and of a normal amount of the analyzable compound in the urine indicates significant insufficiency in bile secretion.

Any analytical method can be used which will determine quantatively the presence of the hydrolyzed analyzable group (—Q'' in Formula I or —NHZ in Formula II) in the collected urine. When the analyzable group is the residue of an aminobenzoic acid or of an aminobenzenesulfonic acid or any of their derivatives, the Bratton-Marshall method, as described in the *Journal of Biological Chemistry*, 128, 537(1939), and in J. A. O. A. C., 51, 612(1968), will be a suitable analytical technique. The analyzable group can also contain tagged atoms. Thus, when this group contains $I^{125}$ or $I^{131}$ atoms, $\gamma$-ray counting can be used as the analytical technique. The analyzable group can also be a dye-forming substance and its presence in the urine can then be determined by colorimetric and related analytical techniques. Furthermore, any of the well-known techniques for quantitatively detecting the presence of fluorescein can conveniently be employed.

The compounds—peptides and esters—which are useful in carrying out the bile sufficiency test of the invention can conveniently be formulated and administered in various forms of pharmaceutical compositions. The pharmaceutical compositions comprise a nontoxic pharmacologically-acceptable carrier or diluent and one or more of the compounds used in the test method of the invention. The peptide and the fluorescein ester can be formulated either together in one unit or, as is preferred, separately in distinct units. Either a solid or a liquid carrier can be used. Among the solid carriers which can be used are lactose, terra alba, sucrose, talc, gelatin, starch, agar, pectin, acacia, calcium phosphate, magnesium stearate, stearic acid, and the like. Among the liquid carriers which can be used are syrup, peanut oil, olive oil, sesame oil, water, and the like. Additionally, the carrier or diluent can include any time delay material known in the art, such as glyceryl monostearate, glyceryl disterate, and the like, either alone or in combination with a wax. Other pharmacologically-acceptable materials such as sweetening agents, flavoring agents, coloring matter or dyes, emulsifying agents, dispersants, suspending agents, thicheners, binders, preservatives, antioxidants, inert diluents, and the like, can also be formulated in the pharmaceutical compositions, if desired. While the majority of the pharmacologically-acceptable materials are inert, it may be advantageous under certain circumstances to incorporate other therapeutic agents in the compositions of the invention. To inhibit the attack of gastric juices on the peptides, it may also be advantageous to formulate the peptide with an antacid ingredient, such as sodium bicarbonate, or the like.

The pharmaceutical compositions of the invention will ordinarily contain from about 250 milligrams to about 3500 milligrams of the peptide and from about 300 mg to about 3500 mg of the ester. A preferred composition will contain from about 350 milligrams to about 700 milligrams of the peptide and about 300 to about 700 mg of the ester. The active compound will normally constitute from about 1 to 95 percent by weight of the total composition. Ordinarily, since it will be desired to administer the active compound or compounds in fairly concentrated form, that is, with only so much pharmaceutical carrier as is necessary or convenient to assist in administration, the active ingredients will constitute under most circumstances a fairly high proportion of the total composition.

The compositions of the invention can be formulated into any of a wide variety of pharmaceutical forms, such as a capsule, tablet, bolus, packaged powder, or a liquid suspension. For example, if a solid carrier is used, the preparation can be tableted, placed in a hard gelatin capsule in powder or pellet form, or made into a troche or lozenge. If a liquid carrier is used, the preparation can be in the form of a syrup, solution, emulsion, soft gelatin capsule, ampul, or liquid suspension. Each of these formulations can be prepared in dosage unit form, such that one or more units contain a quantity of peptide and or a quantity of fluorescein ester suitable for carrying out the bile sufficiency test. The size of the unit dose will, of course, vary with the size of the animal to be tested. Coated or uncoated tablets and capsules are the preferable dosage unit forms.

All of the pharmaceutical preparations of the invention can be made following the conventional techniques of the pharmaceutical chemist, such as mixing, granulating, and compressing, or variously mixing and dissolving the ingredients as appropriate to form the desired end product.

The following examples will further illustrate this invention but are not intended to limit it in any way. Unless otherwise stated, all parts are parts by weight and all temperatures are in degrees Centigrade.

Example 1
Preparation of N-benzoyl-L-phenylalanyl-p-aminobenzoic acid and its sodium salt A solution was made of 13.6g potassium t-butoxide in 100 ml of dimethyl sulfoxide (DMSO). To this was added a solution of 10g of ethyl benzoyl-L-phenylalanyl-p-aminobenzoate in 50 ml of DMSO, at room temperature. After 5 hours, thin-layer chromatography showed no more of the ester, and the reaction mixture was then poured into a mixture of 140 ml of 1N HCl, 1 liter of water and 1.5 kg of ice. After one-half hour, the product was filtered off, washed with water and dried. Recrystallization from ethanol and water gave 7g of the free acid, N-benzoyl-L-phenylalanyl-p-aminobenzoic acid, neutral equivalent 388, m.p. 245–252° C., $[\alpha]_D^{23} + 79°$ (1% in DMF).
Anal: % C found, 70.8 theory 71.1; % H found 5.4, theory 5.15; % N found, 7.0, theory 7.2.

The DL-isomer was prepared in a similar way from ethyl benzoyl-DL-phenylalanyl-p-aminobenzoate to give a crystalline solid, m.p. 248–252° C. The sodium salt of benzoyl-L-phenylalanyl-p-aminobenzoic acid was made by exactly neutralizing the free acid and recovering by lyophilization.

Example 2
Preparation of N-benzoyl-L-phenylalanyl-p-aminohippuric acid and sodium salt Following the procedure of Example 1, benzoyl-L-phenylalanyl-p-aminohippuric acid was prepared by hydrolyzing methyl benzoyl-L-phenylalanyl-p-aminohippurate.

The reaction was very much more rapid with the hippuric esters, so it was terminated after 35 minutes at room temperature. The product melted at 205–208°C., $[\alpha]_D^{23} + 70.5°$ (1% in DMF), neutral equivalent 460. The DL-form was obtained as a colorless solid, m.p. 200–202° C., with the correct analysis. Reaction again was complete in 35 minutes.

The sodium salts of the L- and DL-acids were made by exactly neutralizing the free acids, and recovering by lyophilization.

Example 3
Preparation of N-benzoyl-L-tyrosyl-p-aminobenzoic acid

A mixture was made of L-tyrosine (18.1 g, 0.1 mole) benzoyl chloride (7.0 g, 0.05 mole) and 200 ml anhydrous THF. After stirring at reflux for 2 hours, the mixture was cooled to room temperature, and the precipitate of tyrosine hydrochloride filtered off (11g, 46 meq Cl−). The THF was evaporated and the residue extracted with CCl₄ (3×100 ml at reflux, discarded) and then dissolved in ethyl acetate (200 ml) filtering off insolubles. The ethyl acetate solution was evaporated to yield 13.2g solid product, m.p. 159–162° C. (93 percent). The tyrosine was recovered (8g) by neutralization with aqueous alkali, from the hydrochloride. A sample prepared in a similar way had $[\alpha]_{24}^D - 76°$ (1% in DMF). Anal: % C found 67.1, calc'd 67.4; % H found 5.2, calc'd 5.3; % N found 4.8, calc'd 4.9.

A solution was made of N-benzyl-L-tyrosine (5.7 g, 20 mmoles) and N-methylmorpholine (2.04 g, 20 mmoles) in 60 ml of THF, at −15° C., and to it was added ethyl chloroformate (2.08 g, 20 mmoles). After 12 minutes, p-aminobenzoic acid (2.74 g, 20 mmoles) dissolved in 25 ml of THF and 0.38 g of p-toluenesulfonic acid (2 mmoles) were added, and the temperature allowed to rise to 5° C. After 2 hours and 40 minutes, the mixture was poured into 1 liter of 0.1N sold HCl, stirred one-half hour, filtered and dried, to give 8.7 g, m.p. 192–223° C. The product was recrystallized from 90 ml methanol and 40 ml water, to give 6g (74 percent) of product, N-benzoyl-L-tyrosyl-p-aminobenzoic acid, m.p. 240–242° C., $[\alpha]_{25}^D + 72.3°$ (1% in DMF).
Anal: % C found 68.1, calc'd 68.3; H found 5.1, calc'd 5.0; % N found 6.7, calc'd 6.9, NE 413 (theory 404)

Example 4
Preparation of N-benzoyl-L-methionyl-p-aminobenzoic acid

L-methionine (8.94g) and benzoyl chloride (4.23g) were added to 75 ml tetrahydrofuran, and the mixture refluxed for 2 hours. The mixture was cooled, insoluble L-methionine hydrochloride was filtered off, and washed with 75 ml tetrahydrofuran. The solution was cooled to −15° C., and to it were rapidly added N-methylmorpholine (3.03g) and ethyl chloroformate (3.24g). After 12 minutes, p-aminobenzoic acid (4.11g) and p-toluenesulfonic acid (0.57g) dissolved in 30 ml THF were added. After 2 hours at 5°, the mixture was poured into 1.5 liters of cold 0.1 N HCl, filtered and recrystallized from ethyl acetate to give 6.4g of white solid, N-benzoyl-L-methionyl-p-aminobenzoic acid, melting at 205° C., [α]$_{24}$$^D$ + 65.7° (1% in dimethylformamide).

Anal: % C 61.5, theory 61.3; % H 5.4 theory 5.4; % N 7.3, theory 7.5; % S 8.7, theory 8.6.

Example 5

Preparation of N-acetyl-L-tyrosyl-p-aminobenzoic acid

To a slurry of L-tyrosine (72.4g) in 500 ml dry tetrahydrofuran was added 15.7g acetyl chloride. The mixture was stirred for 18 hours at room temperature, and the tyrosine hydrochloride was removed by filtration. The filtrate was cooled to −15° C., N-methylmorpholine (20.2g) and ethyl chloroformate (21.7g) were added, and 15 minutes later p-aminobenzoic acid (27.4g) and p-toluenesulfonic acid monohydrate (3.8g). After one-half hour at −15° C., the mixture was stirred at 5° C. for 3 hours, and then poured into 6 liters of cold 0.1N HCl, filtered, and dried. The crude product (47g) was recrystallized first from ethanol, ethyl acetate and petroleum ether, and then from aqueous methanol. The final recrystallized product, N-acetyl-L-tyrosyl-p-aminobenzoic acid, 26g, melted at 229–231°C., [α]$_{25.5}$$^D$ + 91.5° (1% in dimethylformamide), neutralization equivalent 367, theory 342, % N found, 7.7, theory 8.2.

Example 6

Preparation of N-propionyl-l-tyrosyl-p-aminobenzoic acid

Following the procedure of Example 5, substituting for the acetyl chloride, 18.5g propionyl chloride, 46g of crude product was obtained. After two recrystallization, as in Example 5, the product, N-propionyl-L-tyrosyl-p-aminobenzoic acid, melted at 241–242° C., [α]$_{25.5}$$^D$ + 89.6 (1% in DMF), neutral equivalent 372, theory 256; % C found 63.7 (theory 64.1); % H found 5.9, theory 5.6; % N found 7.6, theory 7.9.

Example 7

Preparation of N-ethoxycarbonyl-L-tyrosyl-p-aminobenzoic acid

A mixture of L-tyrosine (36.2 g) and ethyl chloroformate (10.9g) in 200 ml tetrahydrofuran was refluxed for 24 hours. After the tyrosine hydrochloride was removed by filtration, the solution was cooled to −15°C., and to it were added N-methylmorpholine (10.1g) and ethyl chloroformate (10.9g) and 15 minutes later p-aminobenzoic acid (13.7g) and P-toluene sulfonic acid monohydrate (1.9g). After one-half hour at −15° C., the mixture was allowed to stand for 24 hours at 5° C. It was then poured into acidic water, and the gummy precipitate was extracted into one liter of ethyl acetate. The extract was dried over anhydrous magnesium sulfate, and stripped to about 100 ml, at which point solids precipitated. The solution was warmed to dissolve the solids, and then chilled to −20° C. to precipitate 20g of crude product. This was recrystallized again from 100 ml of ethyl acetate, chilling to −20°C., to yield 16 g of purified N-ethoxycarbonyl-L-tyrosyl-p-aminobenzoic acid, which had [α]$_{25.5}$$^D$ + 84.3 (1% in DMF): neutral equivalent 379 (theory 372); % C 61.8; theory 61.3; % H 5.7, theory 5.4; % N 7.3, theory 7.5.

Example 8

Preparation of N-benzoyl-L-tyrosyl-4-amino-3,5-dimethylbenzoic acid

Benzoyl-L-tyrosine (4.27g) was dissolved in 100 ml tetrahydrofuran and cooled to −20° C. N-methylmorpholine (1.52g) and ethyl chloroformate (1.65g) were added simultaneously, and the mixture was stirred for 10 minutes at −15° C. To it was added 4-amino-3,5-dimethylbenzoic acid (2.48g) and p-toluenesulfonic acid (0.28 g). After 48 hours at 0° C., the reaction was poured into 1.5 liters of cold 0.1 N HCl, the solid precipitate was filtered off, and recrystallized from methanol and water, to give 4.77 g of N-benzoyl-L-tyrosyl-4-amino-3,5-dimethylbenzoic acid, m.p. 244–248°C., [α]$_{26°}$ $^D$ − 36.9° neutral equivalent 426, theory 432.

Example 9

Assessment of the Bile Sufficiency Test in Vivo

Rats were made either bile deficient or bile and exocrine pancreatic deficient. The bile deficiency was produced by ligating and sectioning the bile duct between the liver and the pancreas. The rats so treated are referred to as BDLS animals. Bile and pancreatic deficiency was produced by ligating the common bile duct at its point of entry into the duodenum. The rats so treated are referred to as P-BDLS animals. Sham operated (laparotomized) rats served as controls.

Following an overnight fast, the rats were dosed with 3 mg fluorescein equivalents/kg of either fluorescein dilaurate (FDL) or fluorescein dihexanoate (FDH) in 0.5 ml olive oil. This was followed by either 6 ml of water or a 33 percent solution of hog bile which was obtained from gallbladders of hogs undergoing laparotomies. The rats were returned to metabolism cages without access to food. Urine was collected for 6 hours and analyzed for fluorescein.

The Greenberger-de Benneville test for exocrine pancreatic function using the peptide, as described above, was administered the next day to those rats which had received fluorescein dihexanoate. In this test, the rats were dosed with 31 mg sodium N-benzoyl-L-tyrosyl-p-aminobenzoate/kg in 1 ml water plus 4 ml 0.5% NaHCO$_3$. Urine was collected for 6 hours and analyzed for total aromatic amines by the Bratton-Marshall method.

Table I summarizes the results of these in vivo tests.

TABLE I

| Surgical Preparation[a] | Number of Rats | Drug Treatment | 6 Hour Recovery of Fluorescein in Urine (%) | 6 Hour Recovery of PABA[b] in Urine (%) |
|---|---|---|---|---|
| Sham | 3 | FDL | 11.0±7.7 | |
| P-BDLS | 2 | Na fluorescein | 8.0±1.8 | |
| P-BDLS | 2 | FDL | 0 | |
| BDLS | 2 | Na fluorescein | 22.3±6.2 | |
| BDLS | 6 | FDL | 0.4±0.3 | |
| BDLS | 2 | FDL + Bile | 3.9±0.4 | |
| Sham | 3 | FDH | 70.2±2.8 | 68.0±5.4 |
| P-BDLS | 2 | FDH | 0.8±0.5 | 4.9±0.3 |
| BDLS | 2 | FDH | 1.0±1.0 | 80.5±1.7 |
| BDLS | 3 | FDH + Bile | 4.2±2.1 | 40.2±16.1 |

[a] P-BDLS—common bile duct ligated and sectioned causing both pancreatic and bile insufficiency. BDLS—bile duct ligated and sectioned resulting in bile deficiency but not pancreatic insufficiency.

[b] PABA = p-aminobenzoic acid.

Free fluorescein was readily absorbed and exrecreted regardless of the presence of pancreatic juice or bile. There was also excretion of fluorescein by sham operated rats dosed with fluorescein dihexanoate or dilaurate. However, fluorescein excretion was practically nil when rats with bile and/or pancreatic juice deficiency were dosed with dialkyl fluorescein esters. The Greenberger-deBenneville test was administered the following day and the results show that this test was specific for the presence of pancreatic juice (low recovery in P-BDLS).

The data in Table I shows the usefulness of the test method of the invention in evaluating bile sufficiency in animals having normal pancreatic enzyme secretion. When other peptides within the scope of Formula I and/or other ($C_4$-$C_{16}$) dialkyl esters of fluorescein are employed, similar evaluations of bile sufficiency are obtained.

Example 10
Pharmaceutical Formulations

Illustrative pharmaceutical composition formulations comprising a pancreatic enzyme-sensitive peptide and a fluorescein ester are set forth below. In each formulation, the designated materials are given in proportions by weight.

TABLETS

| Ingredients | Parts By Weight |
|---|---|
| sodium N-benzoyl-L-phenylalanyl-p-aminobenzoate | 500 |
| fluorescein dilaurate | 500 |
| corn starch | 100 |
| ethylcellulose | 20 |
| calcium stearate | 30 |

After thoroughly blending the above ingredients, tablets are formed by standard means so as to contain 500 mg. of peptide and 500 mg of fluorescein ester per tablet.

CAPSULES

| Ingredients | Parts By Weight |
|---|---|
| sodium N-benzoyl-L-tyrosyl-p-aminobenzoate | 500 |
| fluorescein dihexanoate | 500 |
| corn starch | 50 |
| talc | 50 |

The above ingredients are agitated sufficiently to obtain a uniformly powdered product which is then utilized for the filling of gelatin capsules, both the hard-shelled and soft elastic types. Capsules should be chosen which are of such a size as to be capable of accommodating a sufficient quantity of material to provide 500 mg. of peptide and 500 mg of fluorescein ester per unit. Of course, larger or smaller capsules for different concentrations of active agent may be readily employed where desired or necessitated.

It is to be understood that changes and variations may be made without departing from the spirit and scope of the invention as defined by the appended claims.

I claim:

1. A method for evaluating bile sufficiency in an animal organism which comprises orally administering an effective amount of a DL- or L-isomer of a peptide of the formula $$RCO—A_n—NHR'CO—B_m—NHZ$$

wherein
R is a hydrogen atom; a phenyl group; a phenyl group substituted with one or more halogen atoms, ($C_1$-$C_4$)alkyl groups, hydroxy groups, ($C_1$-$C_4$)alkoxy groups, ($C_1$-$C_4$)alkanoyloxy groups, or ($C_1$-$C_4$)alkoxycarbonyl groups; a ($C_1$-$C_{12}$)alkyl group; a ($C_1$-$C_{12}$)alkyl group substituted with one or more halogen atoms, ($C_1$-$C_4$)alkoxy groups, hydroxy groups, ($C_1$-$C_4$)alkanoyloxy groups, polyalkoxyalkyl groups, or phenyl groups; a ($C_1$-$C_{12}$)alkoxy group; an aralkoxy group of up 10 carbon atoms; or a divalent alkylene group having up to 6 carbon atoms;

NHR'CO is an amino acid linkage derived from L-phenylalanine, L-tyrosine, L-leucine, L-methionine, L-tryptophan, L-arginine, or L-lysine;

NHZ is a pharmacologically-acceptable analyzable group hydrolytically cleavable from the peptide in the presence of a pancreatic endopeptidase to give an analyzable compound which can be absorbed by and excreted from the animal; and wherein Z is a group of the formula

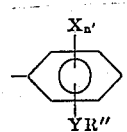

wherein
R'' is a hydroxy group, a ($C_1$-$C_4$)alkoxy group, a ($C_1$-$C_4$)alkoxyalkoxy group, a ($C_1$-$C_8$)dialkylaminoalkoxy group, an amino group, a ($C_1$-$C_4$)monoalkylamino group, a ($C_1$-$C_4$)dialkylamino group, a group of the formula —NHCH$_2$COR''', or a salt of the group in which R'' is a hydroxy group;

Y is a group of the formula —CO— or —SO$_2$—;
X is a hydroxy group, a ($C_1$-$C_4$)alkyl group, a halogen atom, or a ($C_1$-$C_4$)alkoxy group; and
$n'$ is 0, 1, or 2;

A and B are the residues of low molecular weight amino acids, and
$m$ and $n$ are 0, 1, or 2;

orally administering an effective amount of a di($C_4$-$C_{16}$)alkyl ester of fluorescein; collecting the urine of the organism for a sufficient time to permit accumulation of the analyzable compound and of fluorescein; and analyzing the collected urine to determine the quantity of the analyzable compound and the quantity of fluorescein in the urine.

2. The method of claim 1 wherein $n$ and $m$ are zero.

3. The method of claim 2 wherein R is a phenyl group.

4. The method of claim 2 wherein R is a ($C_1$-$C_4$)alkyl group.

5. The method of claim 2 wherein R is a ($C_1$–$C_4$)alkoxy group.

6. The method of claim 2 wherein NHR'CO is phenylalanyl, tyrosyl, or tryptophyl.

7. The method of claim 6 wherein the fluorescein ester is fluorescein dihexanoate or fluorescein dilaurate.

8. The method of claim 2 wherein Z is 4-carboxyphenyl, the sodium salt of 4-carboxyphenyl, or the ammonium salt of 4-carboxyphenyl.

9. The method of claim 2 wherein the peptide is N-benzoyl-L-phenylalanyl-p-aminobenzoic acid, its sodium salt, or its ammonium salt.

10. The method of claim 2 wherein the peptide is N-benzoyl-L-tyrosyl-p-aminobenzoic acid, its sodium salt, or its ammonium salt.

11. The method of claim 2 wherein the peptide is N-acetyl-L-tyrosyl-p-aminobenzoic acid, its sodium salt, or its ammonium salt.

12. The method of claim 2 wherein the peptide is N-propionyl-L-tyrosyl-p-aminobenzoic acid, its sodium salt, or its ammonium salt.

13. The method of claim 2 wherein the peptide is N-butyryl-L-tyrosyl-p-aminobenzoic acid, its sodium salt, or its ammonium salt.

14. The method of claim 1 wherein the peptide and the fluorescein ester are administered in an amount of about 2 mg to about 50 mg/kg of body weight of the animal organism.

15. The method of claim 1 wherein the urine of the animal organism is collected for about 4 to about 10 hours after administering the peptide and ester.

16. A method for evaluating bile sufficiency in an animal organism which comprises orally administering an effective amount of a DL- or L-isomer of a peptide of the formula $$RCO-A_n-NHR'CO-B_m-NHZ$$

wherein
R is a hydrogen atom; a phenyl group; a phenyl group substituted with one or more halogen atoms, ($C_1$–$C_4$)alkyl groups, hydroxy groups, ($C_1$–$C_4$)alkoxy groups, ($C_1$–$C_4$)alkanoyloxy groups, or ($C_1$–$C_4$)-alkoxycarbonyl groups; a ($C_1$–$C_{12}$)alkyl group; a ($C_1$–$C_{12}$)alkyl group substituted with one or more halogen atoms, ($C_1$–$C_4$)alkoxy groups, hydroxy groups, ($C_1$–$C_4$)alkanoyloxy groups, polyalkoxyalkyl groups, or phenyl groups; a ($C_1$–$C_{12}$) alkoxy group; an aralkoxy group of up to 10 carbon atoms; or a divalent alkylene group having up to 6 carbon stoms;

NHR'CO is an amino acid linkage derived from L-phenylalanine, L-tyrosine, L-leucine, L-methionine, L-tryptophan, L-arginine, or L-lysine;

NHZ is a pharmacologically-acceptable analyzable group hydrolytically cleavable from the peptide in the presence of a pancreatic endopeptidase to give an analyzable compound which can be absorbed by and excreted from the animal; and wherein Z is a group of the formula

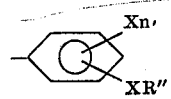

wherein
R" is a hydroxy group, a ($C_1$–$C_4$)alkoxy group, a ($C_1$–$C_4$) alkoxyalkoxy group, a ($C_1$–$C_8$)dialkylaminoalkoxy group, an amino group, a ($C_1$–$C_4$)monoalkylamino group, a ($C_1$–$C_4$)dialkylamino group, a group of the formula —NHCH$_2$COR''', or a salt of the group in which R" is a hydroxy group;

Y is a group of the formula —CO— or —SO$_2$—;

X is a hydroxy group, a ($C_1$–$C_4$)alkyl group, a halogen atom, or a ($C_1$–$C_4$)alkoxy group; and n' is 0, 1, or 2;

A and B are the residues of low molecular weight amino acids, and m and n are 0, 1, or 2;

collecting the urine of the organism for a sufficient time to permit accumulation of the analyzable compound; analyzing the collected urine to determine the quantity of the analyzable compound; orally administering an effective amount of a di($C_4$–$C_{16}$)alkyl ester of fluorescein; collecting the urine of the organism for a sufficient time to permit accumulation of fluorescein; and analyzing the collected urine to determine the quantity of fluorescein in the urine.

* * * * *